United States Patent [19]

Lloyd

[11] 4,101,102

[45] Jul. 18, 1978

[54] VIBRATION ISOLATION LOAD SUPPORT APPARATUS

[75] Inventor: Wayne B. Lloyd, Baltimore, Md.

[73] Assignee: Westinghouse Electric Corp., Pittsburgh, Pa.

[21] Appl. No.: 680,255

[22] Filed: Apr. 26, 1976

[51] Int. Cl.² .................. F16F 15/04; F16F 11/00
[52] U.S. Cl. .................... 248/20; 188/1 B; 248/358 R
[58] Field of Search ............. 248/20, 22, 358 R; 188/1 B

[56] References Cited

U.S. PATENT DOCUMENTS

| | | | |
|---|---|---|---|
| 2,761,638 | 9/1956 | Getline | 248/5 |
| 3,392,953 | 7/1968 | Ciringiong et al. | 248/358 R |
| 3,606,233 | 9/1971 | Scharton et al. | 248/20 X |
| 3,701,499 | 10/1972 | Schubert | 248/20 X |
| 3,703,999 | 11/1972 | Forys | 248/20 |
| 3,730,463 | 5/1973 | Richard | 248/358 R X |
| 3,735,952 | 5/1973 | Platus | 248/358 R |
| 3,807,648 | 4/1974 | Karnopt | 248/20 X |

*Primary Examiner*—J. Franklin Foss
*Attorney, Agent, or Firm*—D. F. Straitiff

[57] ABSTRACT

Vibration isolation apparatus in which the vibration-protected portion thereof is supported by the vibration-prone portion through the medium of a vertically-actuable multiaxis joint assembly that affords 3° of angular freedom. In one embodiment the joint assembly also affords 2° of translational freedom, and in another such translational freedom is introduced at the support for such assembly. Suitably controlled actuators between the two apparatus portions actively isolate a range of vibration frequencies in 6° of freedom. A spring support means for the protected portion offers passive isolation vertically.

4 Claims, 9 Drawing Figures

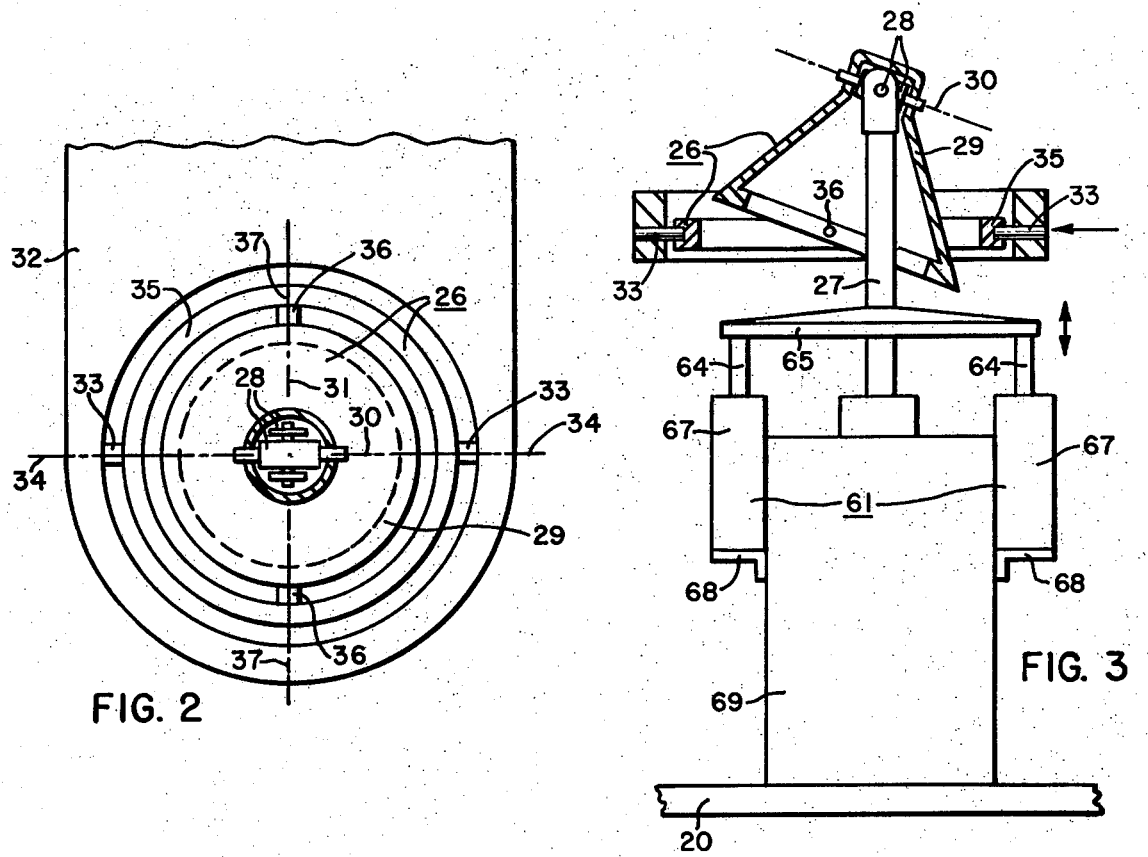
FIG. 2
FIG. 3
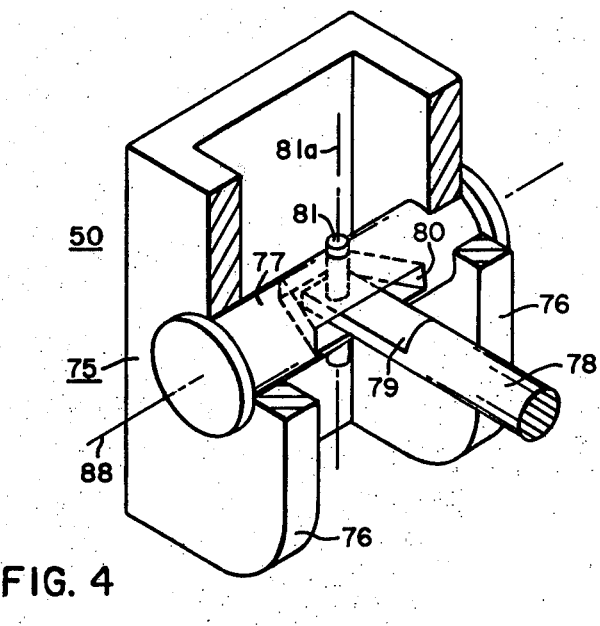
FIG. 4

VIBRATION ISOLATION LOAD SUPPORT APPARATUS

BACKGROUND OF THE INVENTION

1. Field of the Invention

Vibration isolation apparatus for 6° of freedom.

2. Description of the prior art

The following U.S. patents were set forth in a preliminary search: Henderson 1,651,025; Wylie et al. 2,899,882; Bullard 3,464,657; Balke 3,635,427; Mard 3,690,607; Schubert et al. 3,701,499; and, Forys et al. 3,703,999.

Among the foregoing prior art patents, only the Bullard patent and the Schubert et al. patent disclose systems offering potential for vibration isolation with 6° of freedom. In Bullard, however, the horizontal array of actuators would require a high degree of sophisticated control procedure to provide isolation with 6° of freedom, due to an inherent tendency for linear motion of the protected platform to produce considerable angular motion of the actuators; and the system in Schubert et al., with vertical and horizontal arrays of actuators having ball-joint connections at their opposite ends, FIG. 11, utilizes a highly sophisticated type of connection in such ball-joint form.

SUMMARY OF THE INVENTION

The present invention provides an arrangement for 6° vibration isolation with minimal coupling between the translational and angular motion modes and a high degree of kinematic simplicity.

BRIEF DESCRIPTION OF THE DRAWINGS

FIG. 2 is a top view of a biaxial joint assembly employed in triplicate in the embodiment of FIG. 1;

FIG. 3 is an elevation view showing the joint assembly of FIG. 2 in cross section and in a tilted attitude atop a vertically adjustable combined active and passive isolator assembly;

FIG. 4 is a schematic three-dimensional representation, partly in outline and partly in section, showing a suitable form of biaxial angularly adjustable connector for opposite ends of horizontal actuators employed for active vibration isolation in the apparatus of FIG. 1;

DESCRIPTION OF THE PREFERRED EMBODIMENTS

Figure 1:
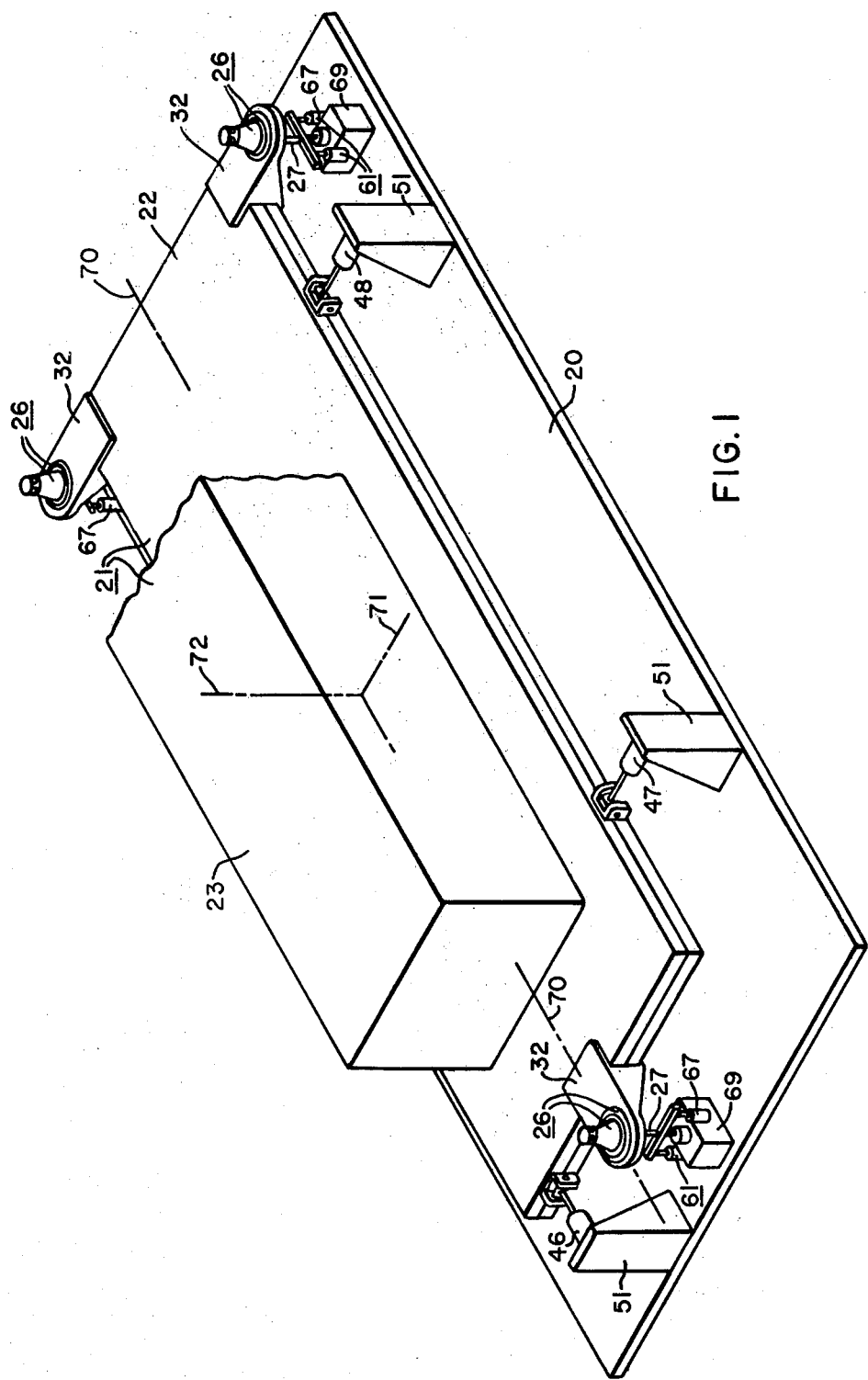
FIG. 1 is a three-dimensional representation in outline showing one embodiment of the vibration isolation apparatus of the present invention in a three-support configuration capable of providing 6° active isolation.

Referring to FIGS. 1 to 3, the vibration isolation apparatus of the present invention comprises a vibration-prone portion 20 which may take the form of a flat rectangular cargo deck to be mounted in an aircraft, for example, and a vibration protected portion 21 that may include a bench 22 in the form of a flat rectangular plate assembly, as shown, and a rectangular housing 23 that may contain an array of optical components (not shown). In accord with a feature of the invention, the bench 22 is supported by a vertically-actuable biaxial joint means 25 exemplified in the form of a triangular array of three bell and ring gimbal assemblies 26, one at the center of one end of the bench 22 and two at the corners of the opposite end, constructed and arranged to provide five degrees of freedom for movement of the bench 22 in addition to the freedom for vertical movement afforded by the vertically movable rods 27 on which such bell and ring gimbal assemblies depend via respective universal joints 28 at the uppermost ends of such rods. In addition, the nature of the bell and ring gimbal assembly provides a gravity-stabilized neutral position to which the platform or bench 22 tends to settle in the relaxed state of the equipment.

Figure 9:
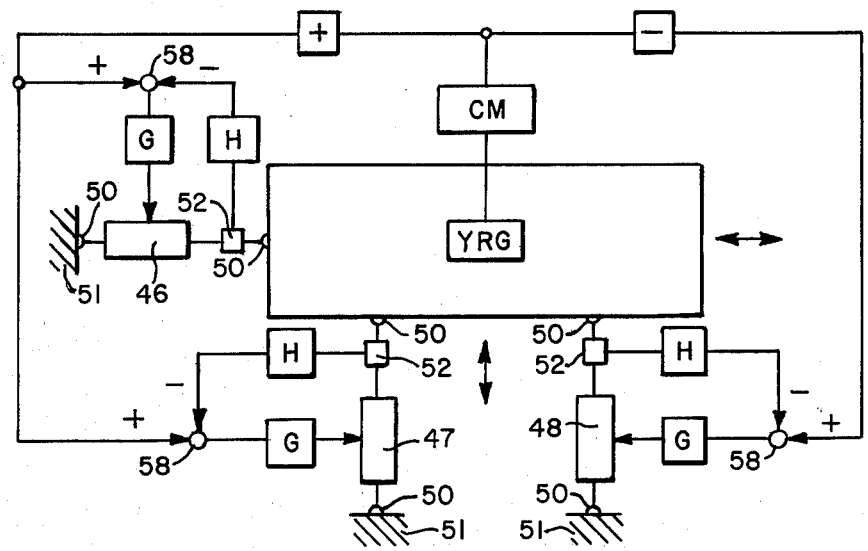

Referring to FIGS. 2 and 3, the bell and ring gimbal assembly 26 includes a bell-shaped member 29 connected at its upper end for freedom of movement about two mutually perpendicular axes 30 and 31 at the top of the vertically movable rod 27 through the medium of the universal joint 28. The lower, divergent, and larger end of the bell-shaped member 29 forms an input part of a second biaxial joint that has an output connection with the bench 22 through the medium of a horizontal bracket member 32, a pair of aligned shaft sections 33 having a rotary axis 34 parallel to the axis 30, a ring 35 pivotally supported by the shaft sections 33 for freedom of movement about the axis 34, and a pair of aligned shaft sections 36 connecting the ring 35 to the bottom rim of the bell-shaped member 29 for freedom of movement about an axis 37 parallel to the axis 31. As arranged in triplicate in association with the bench 22, the axes 30, 34 perpendicular to the axes 31, 37 for convenience are aligned with the mutually perpendicular longitudinal and transverse directions of extension of such bench to afford freedom for longitudinal and transverse translational movement of such bench 22 by pivotal movement at top and bottom of the bell-shaped members 29 in fashion as depicted in FIG. 3; minimal vertical movement of the bench resulting from tilting of such members. By provision of a number of longitudinal and transverse linear actuators 46, 47 and 48 connected at their one ends to edges of bench 22 via universal joints 50 and at their opposite ends via similar joints (not shown) to pedestals 51 mounted on the deck 20, active isolation of the bench 22 and equipment thereon can be obtained. Control of such active isolation of bench 22 from longitudinal and transverse vibration of the mounting deck 20 can be obtained by use of a control system such as shown schematically in FIG. 9 and which embodies well-known techniques involving accelerometers 52 affiliated with output from the actuators 46, 47 and 48, which accelerometers in effect indicate rate of change of translational motion of the bench 22 in different horizontal directions. The accelerometer 52 affiliated with the longitudinal actuator 46 responds to longitudinal movement, and those affiliated with the actuators 47 and 48 at the side of bench 22 respond to lateral movement. Also, by comparing their outputs with that of a yaw rate gyro YRG via a comparator means CM, control of actuators 47 and 48 in unison obtains isolation of bench 22 from yaw-directional vibration of cargo deck 20. In each instance, set point command input to the respective actuator is fed to a summer means 58 that also receives feedback information from the respective accelerometer via a respective signal modifier means H. Output from the summer means 58 commands operation of the respective actuator via a second suitable signal modifier means G. Actuators 46, 47 and 48 may be of the electromagnetic type well-suited for vibration isolation service.

Active isolation of the bench 22 and its payload 23, etc., from vibration of the cargo deck 20 in the vertical, roll, and pitch directions is obtained by actuator means 61 operatively connected to the vertically movable rods 27 on which the bell and ring gimbal assemblies 26 are mounted. Referring particularly to FIG. 3, output from the actuator means 61 occurs by way of rods 64 connected to opposite ends of a horizontal rigid thrust member 65 attached at its midpoint to the respective vertically movable rod 27. Each actuator means 61 includes two actuators 67 which may be of the electromagnetic type and of cylindrical shape coaxial with their output rods 64 mounted on support brackets 68 at their lower end in securement to side walls of a rectangular housing 69 mounted on the cargo deck 20. The several housings 69 may contain a spring means (not shown) for support of the vertically movable rods 27 and load thereon.

Figure 8:
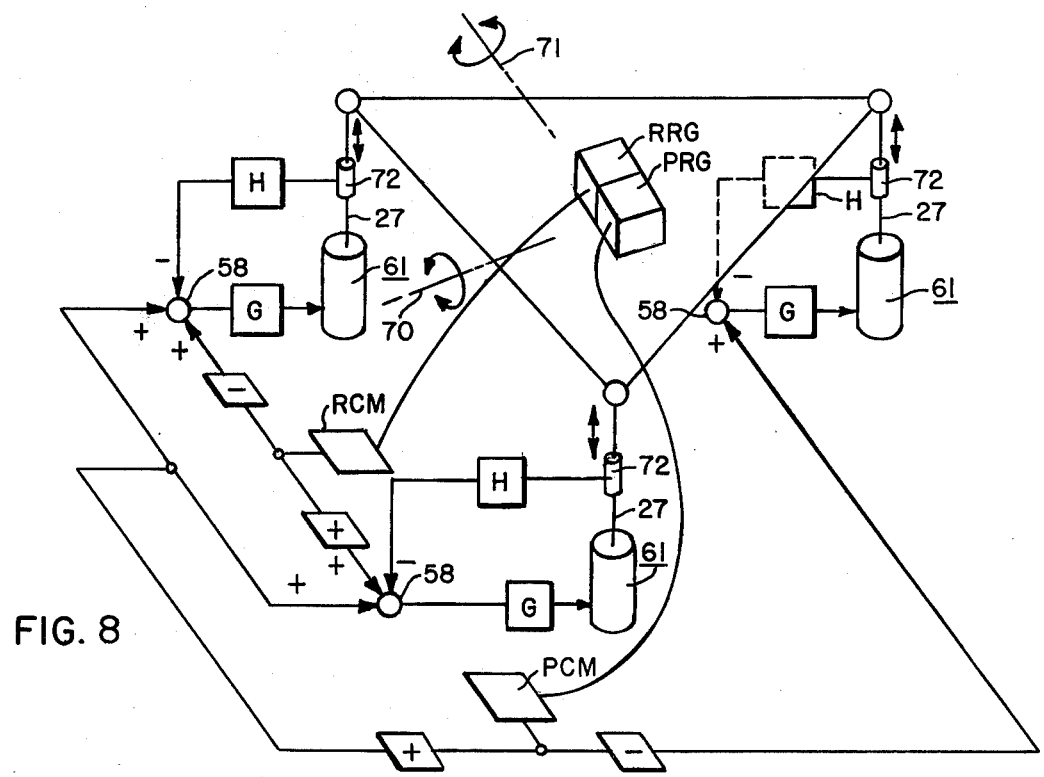
FIG. 8 is a circuit diagram of a portion of the control system for the active isolator actuators for effecting isolation of roll, pitch and vertical vibration; and, FIG. 9 is the remaining portion of the control system for effecting isolation of lateral, longitudinal, and yaw vibration.

Referring to FIGS. 1, 3 and 8, each of the vertically movable rods 27 is provided with a respective vertical accelerometer 72 for sensing rate of vertical movement of the bench 22 at its points of juncture with the rods via the bell and ring gimbal assemblies. Output rates of motion signals from the vertical accelerometers 72 indicative of undesired transmission of vibratory motion from the cargo deck 20 to the bench 22 gets fed back to command the operation of the vertical actuator means 61, individually or collectively, to nullify or minify any such undesired motion. Such feedback signal from a respective accelerometer is suitably modified by a respective signal modifying means H, is compared by a respective summer means 58 with one or more set point inputs to derive a command signal for the respective actuator means via a respective signal modifying means G. By inclusion of a roll responsive gyro, RRG, mounted on the bench 22 and communicating with a roll comparator means, RCM, appropriate inputs to the summer means 58 for the pair of actuator means 61 at one end of bench 22 can be introduced to minimize unwanted vibratory movement of such bench in the roll direction about axis 70 by compensatory differential operation of such two actuator means. Similarly, inclusion of a pitch responsive gyro PRG mounted on bench 22 and feeding information to a pitch comparator means PCM can be made to control appropriate differential operation of the single actuator means 61 at one end of the bench relative to joint operation of the two actuator means 61 at the other end to minimize unwanted vibratory motion of the bench in the pitch direction about the axis 71.

It will be appreciated that the bench 22 in being isolated from the cargo deck 20 with respect to vibratory tilting movement about the roll, pitch, and yaw axes 70, 71 and 72, by suitable operation of the vertical actuator means 61 necessitates biaxial freedom of movement of opposite ends of the horizontal actuators 46, 47 and 48 as provided by the universal joint 50 at such locations. Such a joint 50 is exemplified in FIG. 4 as comprising a bracket member 75 having two parallel lugs 76 in which opposite ends of a pin 77 are journaled. The projecting end of a push rod 78 is provided with a flat-ended portion 79 for disposition in a tapered recess 80 in the pin 77 and retention by a cross pin 81 that enables angular movement of rod 78 horizontally about the axis 81a of such cross pin. At the same time, rod 78 and the pin 77 are free to turn about the axis 82 of the pin 77.

Figure 5:
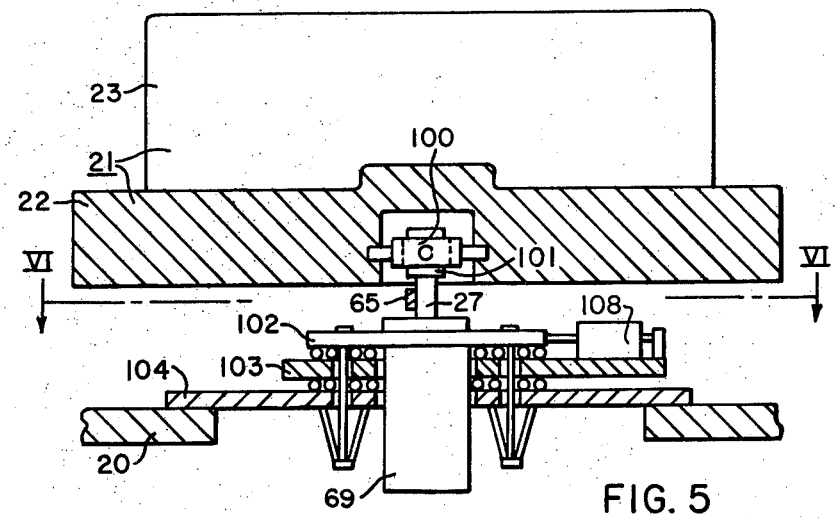
FIG. 5 is a schematic representation in elevation showing an alternate construction of the vibration isolation apparatus of the present invention in a single-support configuration.
Figure 6:
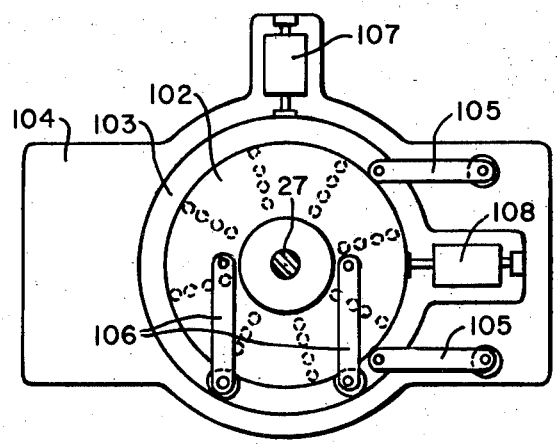
FIG. 6 is a plan view taken along the line VI—VI in FIG. 5.
Figure 7:
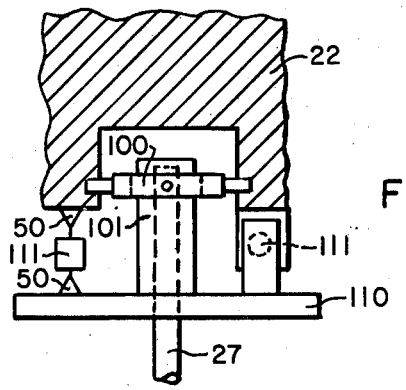
FIG. 7 is an elevation view of portions of the equipment of FIG. 5 showing a suitable arrangement for the active isolator actuators in such equipment.

An alternate arrangement for six-degree freedom support is shown in FIGS. 5, 6 and 7. In this arrangement the bench 22 and its load is supported at its center of gravity by a single universal joint assembly 100 and a single vertical-actuator-pair (not shown) and support ring assembly affiliated with a housing 69 as described hereinbefore. The universal joint 100 is carried atop the vertically movable support rod 27 via a cap member 101 to afford freedom for roll, pitch, yaw, and vertical movements and the housing 69 is supported on the cargo deck 20 through the medium of an assembly of three ball-bearing-separated plate members 102, 103 and 104 interconnected by a system of pin-connected linkages 105 and 106 to afford freedom for a suitable degree of friction-free travel of housing 69 in lateral and longitudinal directions relative to the cargo deck 20. Actuators 107 and 108 interposed between plate members 103 and 104 and between 103 and 102, respectively, provide for effecting active isolation of longitudinal and transverse vibration between deck 20 and bench 22 via joint 100, cap member 101, support rod 27, the spring support within housing 69, such housing, the plate member 102, etc. To provide for active isolation of bench 22 in the roll, pitch, and yaw modes, as shown in FIG. 7, the cap member 101 may be provided with a bottom flange 110 to accommodate universal joint 50 connection of one end of each of a system of actuators 111 which are universal-joint-connected at the opposite end to bench 22 and appendages attached thereto for action vertically and horizontally.

What is claimed is:

1. Load support apparatus comprising a vibration-prone mounting member and a load-bearing mounted member,
    a plurality of vertically-movable four-axis joint means carried by said mounting member and supporting said mounted member at horizontally spaced apart locations with freedom for relative movement between the two members in the vertical, longitudinal, lateral, roll, pitch, and yaw modes, and
    actuator means for effecting active vibration isolation in each of the aforesaid modes.

2. Load support apparatus as set forth in claim 1, wherein said plurality of vertically-movable four-axis joint means is in form of a plurality of bell-and-ring gimbal assemblies at three or more horizontally-spaced-apart locations on said mounted member.

3. Load support apparatus as set forth in claim 2, wherein each of said bell-and-ring gimbal assemblies is affiliated with a vertically movable support rod and comprises,
    a bell-shaped member having a small-diameter upper end and a large-diameter lower end,
    universal joint means interconnecting the upper end of said member to the upper end of said support rod, a ring gimbal having pivotal support by the lower end of said bell-shaped member, and pivotally supporting said mounted member along an axis perpendicular to that of the aforesaid pivotal support.

4. Load support apparatus comprising, a vibration-prone mounting member, a load-bearing mounted member, a vertically-movable support rod assembly, a biaxial joint means disposed on said support rod assembly and supporting said mounted member at its center of gravity with freedom for pitch, roll and yaw motions, ball-bearing-separated plate members supported by said mounting member and supporting said vertically-movable support rod assembly, said ball-bearing-separated plate members being interconnected by linkages to afford a degree of frictionfree motion between mounting and mounted members in lateral and longitudinal directions, and actuator means for effecting active vibration isolation of the aforesaid motions.

* * * * *